United States Patent
Knoller

(10) Patent No.: US 10,363,942 B2
(45) Date of Patent: *Jul. 30, 2019

(54) LONGITUDINAL GUIDING DRIVER ASSISTANCE SYSTEM IN A MOTOR VEHICLE

(71) Applicant: Bayerische Motoren Werke Aktiengesellschaft, Munich (DE)

(72) Inventor: Stefan Knoller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,245

(22) Filed: Oct. 12, 2017

(65) Prior Publication Data

US 2018/0029609 A1    Feb. 1, 2018

Related U.S. Application Data

(63) Continuation of application No. PCT/EP2016/058044, filed on Apr. 13, 2016.

(30) Foreign Application Priority Data

Apr. 28, 2015  (DE) .................. 10 2015 207 821

(51) Int. Cl.
*B60W 50/08* (2012.01)
*B60K 26/00* (2006.01)
(Continued)

(52) U.S. Cl.
CPC ....... *B60W 50/085* (2013.01); *B60K 31/0058* (2013.01); *B60W 30/143* (2013.01);
(Continued)

(58) Field of Classification Search
CPC ...... B60W 50/08; B60W 30/18; B60W 30/14; B60K 26/00; G01C 21/00; G06F 7/00;
(Continued)

(56) References Cited

U.S. PATENT DOCUMENTS 3,655,962 A  *  4/1972  Koch .................... B60T 7/128
                                                  246/182 C
8,983,679 B2 *  3/2015  Kitahama ............. G01C 21/34
                                                        701/1
(Continued)

FOREIGN PATENT DOCUMENTS

DE   10 2007 005 245 A1   11/2007
DE   10 2008 018 421 A1    9/2009
(Continued)

OTHER PUBLICATIONS

International Search Report (PCT/ISA/210) issued in PCT Application No. PCT/EP2016/058044 dated Jul. 5, 2016 with English translation (Six (6) pages).
(Continued)

*Primary Examiner* — Yuri Kan
(74) *Attorney, Agent, or Firm* — Crowell & Moring LLP

(57)  ABSTRACT

A driver assistance system in a motor vehicle includes a map-based detection system for detecting upcoming events which lead to a change in the maximum permissible speed, and a functional unit which, when a relevant upcoming event is detected by the map-based detection system, at a defined time before the upcoming event is reached, initiates an output of a request indication to permit an automatic adjustment of the current maximum permissible speed to a new maximum permitted speed. When a manually triggered authorization confirmation or detected rejection is identified the functional unit, initiates a withdrawal of the request indication. The functional unit is configured to prompt a withdrawal of the output of the request indication after passing the relevant upcoming event when there is no detected authorization confirmation or no detected rejection.

13 Claims, 2 Drawing Sheets

(51) Int. Cl.
*B60W 30/18* (2012.01)
*G01C 21/00* (2006.01)
*G08G 1/00* (2006.01)
*B61L 3/08* (2006.01)
*B60W 30/14* (2006.01)
*G06F 3/0484* (2013.01)
*G05D 1/00* (2006.01)
*B60W 50/00* (2006.01)
*B60W 50/14* (2012.01)
*B60K 31/00* (2006.01)

(52) U.S. Cl.
CPC ...... *B60W 30/146* (2013.01); *B60W 50/0097* (2013.01); *B60W 50/14* (2013.01); *B60K 2310/244* (2013.01); *B60W 2050/0083* (2013.01); *B60W 2050/146* (2013.01); *B60W 2420/403* (2013.01); *B60W 2550/22* (2013.01); *B60W 2550/402* (2013.01)

(58) Field of Classification Search
CPC ......... G06F 3/0484; G08G 1/00; B60T 7/128; G05D 1/00; B61L 3/08
See application file for complete search history.

(56) References Cited

U.S. PATENT DOCUMENTS

| | | | | |
|---|---|---|---|---|
| 9,783,200 | B2* | 10/2017 | Park | B60W 30/18072 |
| 2006/0244632 | A1* | 11/2006 | Corcoran, III | B60Q 1/44 |
| | | | | 340/902 |
| 2009/0210150 | A1* | 8/2009 | Shiun-Chih | G08G 1/123 |
| | | | | 701/532 |
| 2010/0211247 | A1* | 8/2010 | Sherony | B60W 30/1882 |
| | | | | 701/31.4 |
| 2013/0219294 | A1* | 8/2013 | Goldman-Shenhar | G06F 3/0484 |
| | | | | 715/751 |
| 2014/0200788 | A1* | 7/2014 | Eriksson | B60K 31/0058 |
| | | | | 701/93 |
| 2015/0046084 | A1* | 2/2015 | Choi | G01C 21/3697 |
| | | | | 701/468 |
| 2016/0101780 | A1* | 4/2016 | Park | B60W 50/0097 |
| | | | | 701/70 |
| 2018/0037225 | A1* | 2/2018 | Knoller | B60W 50/0097 |

FOREIGN PATENT DOCUMENTS

| | | |
|---|---|---|
| DE | 10 2010 054 241 A1 | 6/2012 |
| DE | 10 2012 211 967 A1 | 1/2014 |
| DE | 10 2013 205 609 A1 | 10/2014 |
| DE | 10 2014 017 522 A1 | 6/2015 |
| DE | 10 2014 215 673 A1 | 2/2016 |
| EP | 2 803 521 A2 | 11/2014 |

OTHER PUBLICATIONS

German-language Written Opinion (PCT/ISA/237) issued in PCT Application No. PCT/EP2016/058044 dated Jul. 5, 2016 (Six (6) pages).

German-language Office Action issued in counterpart German Application No. 10 2015 207 821.3 dated Jan. 19, 2016 with English translation (Six (6) pages).

* cited by examiner

LONGITUDINAL GUIDING DRIVER ASSISTANCE SYSTEM IN A MOTOR VEHICLE

CROSS REFERENCE TO RELATED APPLICATIONS

This application is a continuation of PCT International Application No. PCT/EP2016/058044, filed Apr. 13, 2016, which claims priority under 35 U.S.C. § 119 from German Patent Application No. 10 2015 207 821.3, filed Apr. 28, 2015, the entire disclosures of which are herein expressly incorporated by reference.

This application contains subject matter related to U.S. application Ser. No. 15/784,779, entitled "Longitudinal Guiding Driver Assistance System in a Motor Vehicle" filed on Oct. 16, 2017.

BACKGROUND AND SUMMARY OF THE INVENTION

The invention relates to a longitudinally guiding driver assistance system in a motor vehicle.

In principle, many longitudinally guiding driver assistance systems, which are in the form of speed regulation systems and regulate the speed of the motor vehicle to a predefined desired or maximum permissible maximum speed, are already known. In addition to these longitudinal regulation systems, longitudinal regulation systems enhanced with distance regulation, so-called distance-based longitudinal regulation systems, or speed regulation systems, can also nowadays already be purchased from some manufacturers. Such systems offered (for example by the Applicant of the present patent application under the name "active cruise control") make it possible to automatically guide the motor vehicle at a desired or accordingly lower speed while complying with a desired distance from a vehicle traveling in front. If a distance sensor system, which is fitted to the motor vehicle and can operate, in particular, on a radar basis, detects a target object or (motor) vehicle traveling in front in its own lane, its own speed is adapted (for example by causing a suitable braking torque) to the speed of the motor vehicle traveling in front or of the target object such that distance regulation included in the "active travel speed regulation" or in the corresponding longitudinal regulation system automatically adjusts and complies with a distance from the motor vehicle or target object traveling in front which is appropriate to the situation.

Longitudinally guiding driver assistance systems which are in the form of so-called speed restriction systems and prevent the maximum permissible speed set by the driver from being exceeded are also known.

DE 10 2012 211 967 A1 describes a combination of a speed restriction system and a speed regulation system, the maximum permissible maximum speed of the speed restriction system being able to be adopted, instead of the selected set speed, as the (new) desired or target speed for the speed regulation.

Finally, recent vehicles also contain driver assistance systems which predictively identify a speed restriction either from map data from a navigation system and/or by use of image processing and can permanently display this to the driver after reaching the speed restriction. The result is that the driver can independently adapt his speed to the speed restriction if necessary (for example, BMW Speed Limit Info).

DE 10 2008 018 421 A1 discloses a driver assistance system for transmitting and receiving speed data and/or traffic density data for controlling a speed regulation system which determines a maximum permissible maximum speed on the basis of the received data and communicates this to the driver by outputting a corresponding notification. The driver can adopt this specification of the permissible speed for his speed regulation system by means of simple actuation.

DE 102014215673 A1, which is still unpublished, likewise discloses a longitudinally guiding driver assistance system which determines a deceleration strategy, if an upcoming event which requires a speed reduction is identified, and, at a defined time before reaching the event, outputs a request notification to the driver for permitting the automatic implementation of the deceleration strategy. If the driver actuates the request notification, automatic implementation of the deceleration strategy is initiated. In this case, the identification unit can determine or identify a relevant event either on the basis of map data (for example from a navigation device) or on the basis of camera data.

The object of the invention is to provide an improved longitudinally guiding driver assistance system which outputs a predictive notification of a change in the maximum permissible maximum speed in a manner which can be understood by the driver.

This and other objects are achieved by a driver assistance system according to the invention for a motor vehicle comprising a map-based detection system for identifying upcoming events which result in a change in the maximum permissible maximum speed, and a functional unit which, if a relevant upcoming event is identified by the map-based detection system, causes output of a request notification to permit an automatic adjustment of the currently maximum permissible maximum speed to a new maximum permissible maximum speed at a defined time before the upcoming event is reached. If a (manually) triggered permission confirmation (for example by actuating an operating element) is identified, an automatic adjustment of the currently maximum permissible maximum speed to a (determined) new maximum permissible maximum speed is carried out.

The upcoming events may be, for example, temporary or permanent speed restrictions which are either directly indicated on a traffic sign or can be derived therefrom on the basis of the general traffic rules (for example, there is a speed restriction to 50 km/h when passing through a town in Germany). The event may likewise also be an event which eliminates a speed restriction or at least an event which causes an increase to a new maximum speed, as is usually the case when leaving a town, for example.

The (new) maximum permissible maximum speed which is relevant to the longitudinally guiding speed system at the location of the upcoming event can be either the actually predefined new speed restriction or a speed which differs upward or downward from the predefined new speed restriction by a predefined amount, in which case the amount and direction of the difference can also be set by the driver in a central vehicle menu, for example. This new maximum speed can be directly transmitted to the functional unit or it can be determined on the basis of the available information in the functional unit.

Alternatively or additionally, it is also possible for the driver himself to stipulate speed limits in a location-based manner on a route known to him using an interface inside or outside the vehicle. When driving along the route with an active longitudinal guidance system, these speed limits can be accordingly taken into account as new maximum speeds.

In this case, the driver can also select in advance, for example, whether he fundamentally wishes to have all speed limits stipulated by himself taken into account or only speed limits selected according to a rule, for example only on a particular route, for particular road classes, at a particular time, depending on weather conditions, etc. It is also possible to create a plurality of speed profiles for a particular route section which are then active according to predefined rules (speed profile for good road conditions, speed profile for wet roads and/or speed profile for snow-covered roads).

The term "time" can be understood as meaning a local time, the reaching of which causes the output of the request notification.

The functional unit is also set up to cause withdrawal of the output of the request notification if permission confirmation is identified. The output of the request notification is likewise withdrawn if a (manually) triggered rejection of the request notification is identified.

The invention is based on the following knowledge. If the upcoming event which results in a change in the maximum permissible maximum speed is identified by means of a map-based detection system, that is to say the location of the relevant event is determined from the map data used, a situation may occur, on the basis of the map data used, in which the location of the relevant event stored in the map data does not match the actual location of this event. In the map data conventionally used nowadays, the location of the upcoming event is generally stored before the actual location of the relevant event. Furthermore, speed-restricting events which are not in the actual course of the road (any longer) may be stored in the map data.

In order to prevent an upcoming event which is identified using a map-based detection system and results in a change in the maximum permissible maximum speed from being permanently displayed, provision is fundamentally made for the output of the request notification to be withdrawn at some point even if permission confirmation is not identified or rejection is not identified. However, since the relevant location determined on the basis of the map data is often before the actual location of the relevant event, a situation might occur, if the display of the request notification is withdrawn too early, in which, if the upcoming speed limit is perceived by the driver only shortly before the actual location and the permission to automatically change the maximum permissible maximum speed only then wishes to be confirmed, this is no longer possible under certain circumstances, the map-based location has already been passed and the output of the request notification has already been withdrawn. This might result in a misunderstanding by the driver.

In order to prevent such a situation, the invention also provides for the functional unit to be set up to cause withdrawal of the output of the request notification, and therefore also withdrawal of the possibility to permit the automatic adjustment of the maximum permitted maximum speed, only after the identified relevant event has happened, that is to say only after the location of the relevant upcoming event, as determined from the map data, if permission confirmation is not identified and if rejection is not identified.

For this purpose, the functional unit is advantageously set up, if permission confirmation is not identified and if rejection is not identified, to cause withdrawal of the display of the request notification at the earliest when the location of the relevant event determined on the basis of the map data has been reached and a time or distance interval which begins with the reaching of this location has additionally passed. A time interval can be understood as meaning a period, and a distance interval can be understood as meaning a route length, in which case a combination of a time interval and a distance interval is also contemplated. The (respective) time and/or distance interval can be advantageously predefined on the basis of predefined parameters, for example the speed. The time or distance interval may likewise also be composed of a constant interval portion and a speed-dependent interval portion in order to thus enable an optimum period for displaying the request signal if a permission signal is not confirmed.

If the longitudinally guiding driver assistance system includes a further detection system which can identify upcoming events which result in a change in the maximum permissible maximum speed on the basis of camera-based data, the functional unit may be set up in one particularly advantageous configuration of the invention, if permission confirmation is not identified and rejection is not identified, to cause withdrawal of the output of the request notification (at the earliest) after the time and/or distance interval has passed only when the same relevant event has not been identified using a camera-based detection system before the time or distance interval has passed.

Waiting for a predefined time and/or distance interval after reaching the map-based relevant location is therefore advantageous since identification of the relevant location using a camera-based detection system often takes place only very late on account of the evaluation of camera data, under certain circumstances even so late that output of the request notification on the basis of the camera-based determined relevant location is carried out only after the actual location of the relevant event. If the display of the (first) request notification were already withdrawn at the map-based determined location of the relevant event, the display would be activated again a short time later since the relevant event has now been identified by the camera-based determination unit. In principle, the display of the request notification, which is activated on the basis of the camera-based determination of the relevant location, can remain activated until there is a permission confirmation or rejection by the driver or until this relevant event is canceled by a new event or a new request notification is intended to be displayed for an upcoming new event.

The longitudinally guiding driver assistance system according to the invention can be used for various types of support for the driver during longitudinal guidance.

The longitudinally guiding driver assistance system may therefore be in the form of a speed restriction system, for example, in which a maximum permissible limit speed can be predefined and the functional unit is set up to prevent the predefined or set maximum permissible speed from being exceeded by accordingly controlling the drive. If an upcoming event which results in a change in the maximum permissible maximum speed is now identified on the basis of map-based identification, the functional unit may be set up to then cause output of the request notification to permit automatic adjustment of the currently predefined maximum permissible maximum speed to a new maximum permissible maximum speed at a defined time before the upcoming event is reached, that is to say in a predictive manner. If the driver confirms the permission for the automatic adjustment of the maximum permissible maximum speed by means of a corresponding action, the functional unit then causes a corresponding adjustment. Depending on the direction in which the maximum speed has been adjusted, a higher speed than before or only a lower speed than before can then be permitted. If, before the maximum speed is adjusted for example, a speed was requested which was previously not permitted on account of the original maximum permitted maximum speed, the functional unit can now permit an accordingly higher speed, at least when the request is below the new maximum permitted maximum speed. If the originally permitted maximum speed was greater than the newly permitted maximum speed, the functional unit may cause a corresponding reduction in the actual speed, ideally in such a manner that—if still possible—the new maximum permitted maximum speed is no longer exceeded at the location of the relevant event. If such an adjustment is no longer possible since the location has already been passed, it is possible to brake to the new maximum speed according to a predefined deceleration strategy.

In an alternative embodiment, the longitudinally guiding driver assistance system may also be in the form of a speed regulation system (with or without a distance function), the maximum permissible maximum speed being able to be used as the desired speed. In this case, however, it is possible to predefine a restriction such that the maximum permissible maximum speed can be (temporarily) used as the new desired speed only when it is lower than a maximum permissible desired speed predefined by the driver. In accordance with this restriction, the functional unit can be designed to only cause the output of a request notification to permit a change in the maximum permissible maximum speed (in this embodiment: desired speed) and, upon confirmation, to cause an adjustment of the speed regulation taking into account this new desired speed when the new maximum permissible maximum speed is lower than the maximum desired speed predefined by the driver. It is therefore possible to ensure that the decision on the maximum permissible speed which the driver wishes to achieve during free travel still remains with the driver.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
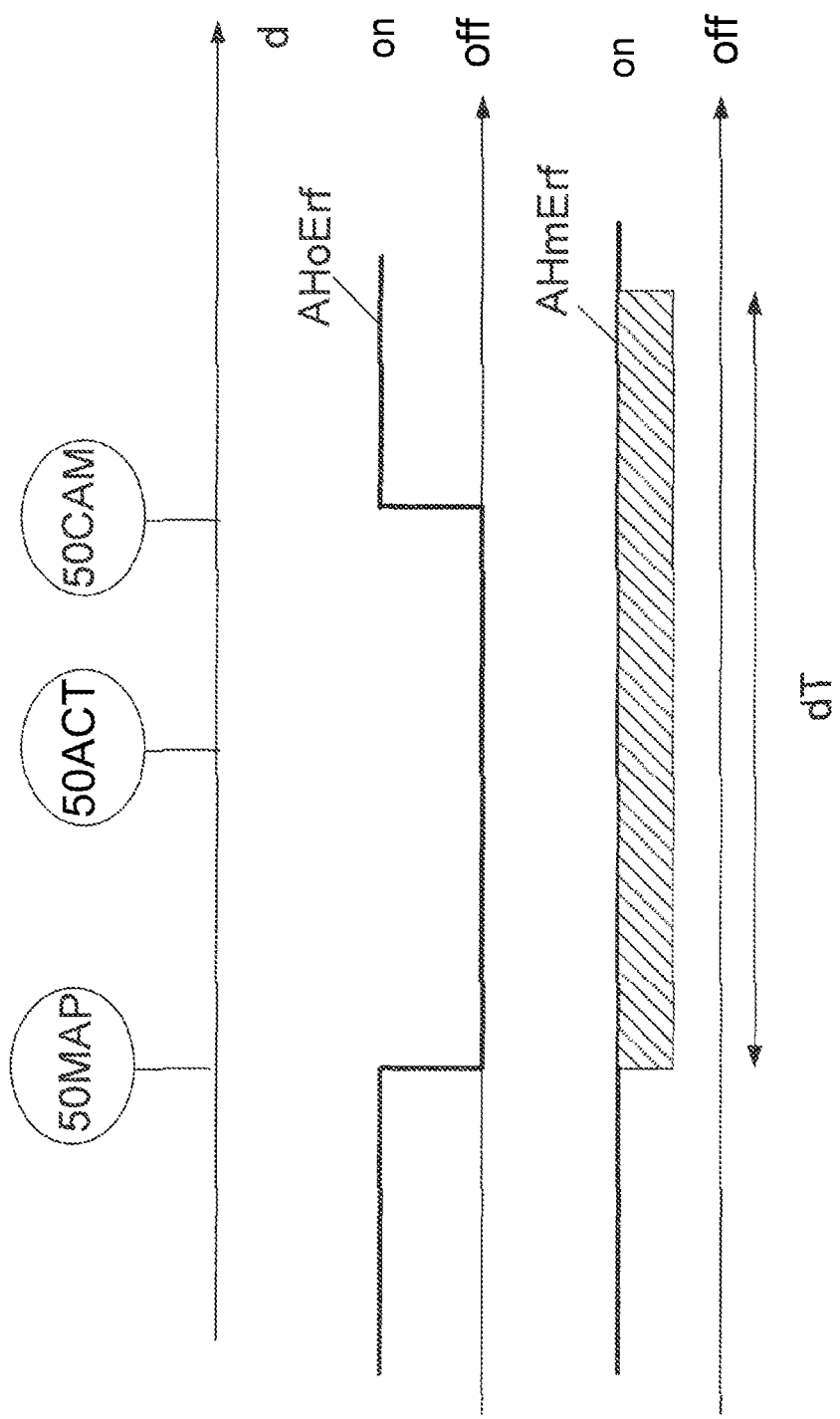
FIG. 1 shows an illustration for explaining the advantage of the invention.

FIG. 1 illustrates how the determined locations of the same relevant event can differ from one another over a distance d depending on the type of detection system.

For example, the maps usually used nowadays are constructed in such a manner that the positions of traffic signs, for example a speed restriction sign 50 MAP, stored in the maps are entered before the actual location 50 ACT of the same event. In contrast to this, on the basis of the data from a camera system such a relevant event 50 CAM can be identified only relatively late. On account of the evaluation of the data from the camera system, it is therefore not unusual for a camera-based detection system to identify the relevant event 50 CAM only after the actual location 50 ACT has been passed. The order is therefore typically as follows: the map-based location 50 MAP of the traffic sign is first passed, then the actual location 50 ACT of the sign, and finally the location 50 CAM of the output using the camera-based traffic sign identification.

Since the relevant location 50 MAP determined on the basis of the map data is now before the actual location 50 ACT of the relevant event, the situation might occur, if the display of the request notification is withdrawn directly at the location 50 MAP of the relevant event determined from the map data, in which, if the upcoming speed limit is perceived by the driver only shortly before the actual location 50 ACT and only then wishes to confirm the permission to automatically change the maximum permissible maximum speed, this is no longer possible. This is because the map-based location 50 MAP has already been passed and the output of the request notification has already been withdrawn. Renewed activation would then take place a short time later with identification of the same relevant event 50 CAM by the camera-based detection unit.

Such an activation and deactivation sequence of the request notification AHoErf is shown below the sign identification illustration in FIG. 1.

The configuration according to the invention of a longitudinally guiding driver assistance system makes it possible to ensure that the request notification is not briefly withdrawn since this is maintained by maintaining the display for a predefined interval dT which is started with the occurrence of the map-based identified relevant event 50 MAP; see, in this respect, the third line AHmErf.

Figure 2:
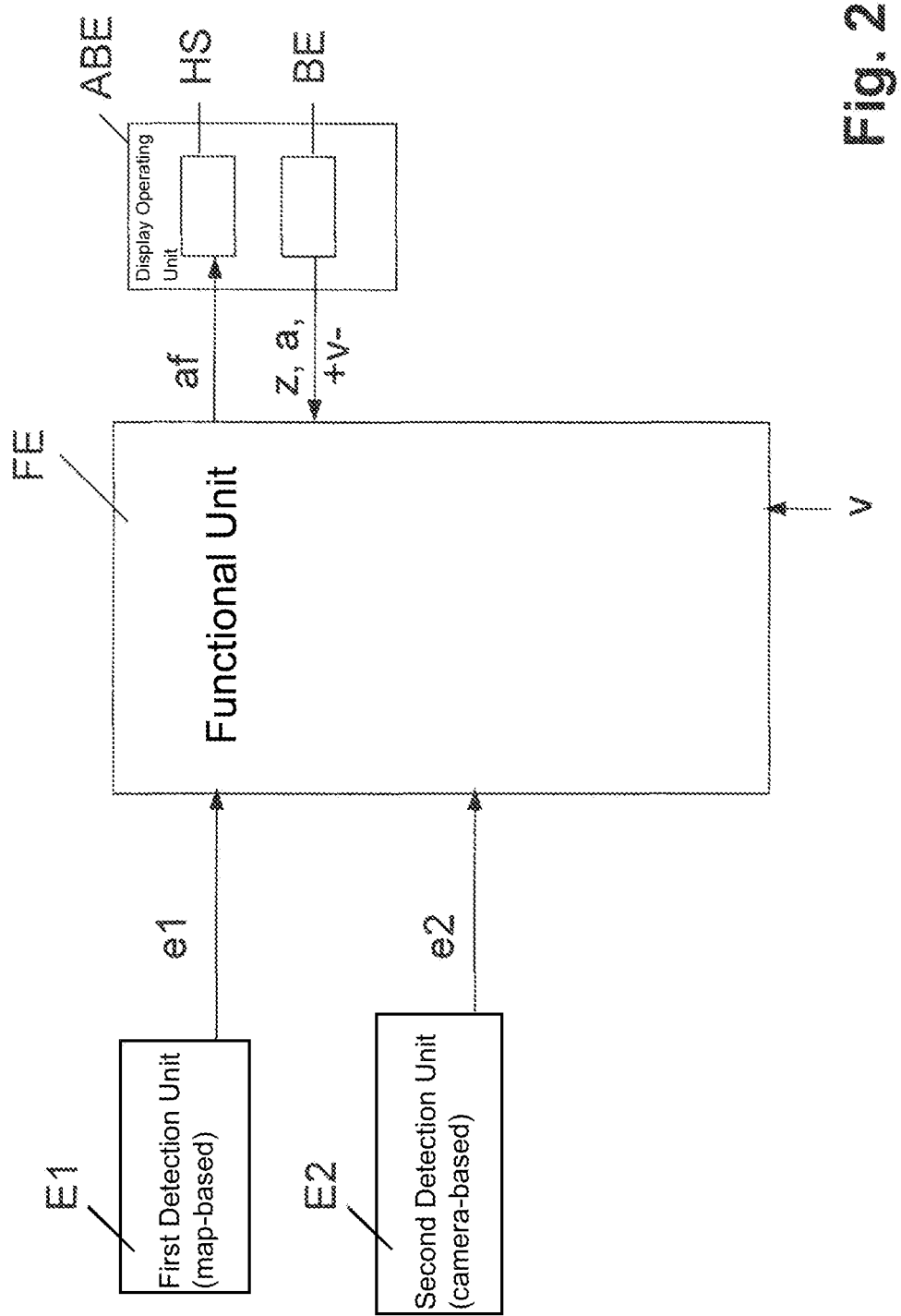
FIG. 2 shows a first exemplary structure of a longitudinally guiding driver assistance system which is in the form of a speed regulation system in a motor vehicle and is intended to regulate the speed to a desired speed.

FIG. 2 now shows in detail, as a central element of a driver assistance system, a functional unit FE which receives input signals e1 from a first detection unit E1, input signals e2 from a second detection unit E2, a speed signal v, a permission signal z for permitting an automatic adjustment of the maximum permissible maximum speed, a rejection signal a for rejecting the permission to automatically adjust the maximum permissible maximum speed, and a signal +v- for manually adjusting the maximum permissible maximum speed. The functional unit may be implemented in hardware, software, or a combination of both, such as a microprocessor that executes program code.

The first detection unit E1 is a map-based detection unit E1 which identifies upcoming events which require (for example speed restriction) or allow (for example cancellation of a speed restriction) an adjustment of the maximum permissible maximum speed on the basis of available map data, its own position and a known upcoming route section.

The second detection unit E2 is a camera-based detection unit E2 which identifies upcoming speed-restricting events which possibly require an adjustment of the maximum permissible maximum speed to a new maximum speed on the basis of the data from a (for example video) sensor system oriented to the front. In contrast to the map-based detection unit E1, the camera-based detection unit E2 can identify the relevant locations only at relatively short notice on the basis of the sensor system or only after the relevant event has occurred on account of the necessary signal processing.

Both the map-based detection unit E1 and the camera-based detection unit E2 are configured in such a manner that they can identify the location of the upcoming relevant event, that is to say also the level of the maximum permitted limit speed applicable from this location, and can forward it to the functional unit FE.

As soon as relevant data e1 relating to the location of an upcoming relevant event and the level of the maximum permitted limit speed from this location are available to the functional unit FE, the functional unit FE can first of all determine the maximum permissible maximum speed at the location of the upcoming event, possibly taking into account a driver specification. Alternatively, the transmitted maximum permitted limit speed can also be directly used as the maximum permissible maximum speed.

On the basis of available relevant data, for example the relative speed between the vehicle and the determined maximum speed, the distance to the relevant object and/or a determined deceleration strategy, the functional unit FE causes the output of a request signal af at a defined time by way of a corresponding signal af to a display operating unit ABE. The display operating unit ABE includes a notification system HS and an operating element BE. The output of the request signal is made approximately at the time at which a determined deceleration strategy, for example, would have to be implemented by use of corresponding speed regulation. The result is that the determined new maximum speed is achieved at the location of the upcoming event. Depending on the configuration of the speed regulation system, according to a first alternative, the output may in principle be caused only when the determined new maximum permissible maximum speed is less than the maximum desired speed predefined by the driver. According to a second alternative, the output can be effected irrespective of the maximum desired speed wanted by the driver.

The operating element BE which can be used by the driver to confirm the request notification is configured in such a manner that the driver can request a manual adjustment of the maximum desired speed +v- at those times at which no request notification is output. The operating element BE is also configured in such a manner that the driver can confirm (signal z) the requested permission to automatically adjust the permissible maximum speed by way of a first type of actuation or can reject (signal a) the requested permission to automatically adjust the maximum permissible maximum speed by way of a second type of actuation upon output of the request notification.

Only when the driver confirms the request signal by actuating the operating element BE according to the first type of actuation upon output of the request notification does the display operating unit ABE transmit a corresponding "permission" signal z back to the functional unit FE. The functional unit FE then begins to initiate the automatic adjustment of the maximum permissible maximum speed and—according to the new maximum speed—an adjustment of the speed regulation taking into account the new maximum permissible maximum speed. If the vehicle is in the so-called free travel mode, for example, the speed is regulated in order to reach the new maximum speed at the location of the decisive event. If the vehicle is in the so-called follow-on mode following a target object traveling in front, the follow-on travel regulation is (initially) continued taking into account the new maximum permissible maximum speed. At the same time, the output of the request notification is caused to be withdrawn if the manually triggered permission confirmation is identified.

If the driver rejects the permission to automatically adjust the maximum permissible maximum speed by actuating the operating element BE according to the second type of actuation upon output of the request notification, the display operating unit transmits a signal a back to the functional unit FE. The functional unit then rejects the newly determined maximum permissible maximum speed and continues the current speed regulation. At the same time, the output of the request notification is caused to be withdrawn if the manually triggered rejection is identified.

The functional unit FE is now also set up, if permission confirmation is not identified and rejection is not identified, to start a "distance timer" upon reaching the relevant location determined from the map data, which timer monitors whether the vehicle is still within a predefined distance interval or time interval after passing the relevant location. In this case, the interval may be predefined in such a manner that this interval is composed of a first (constant-distance) interval portion and a second, speed-dependent time or distance interval portion. The interval is ideally in the form of a time interval and is composed of a first (constant) time interval, which is determined in such a manner that a predefined (constant) distance (for example 30-40 m) has been covered, and a second, variable time interval. The constant time interval portion is used to bridge the distance interval between the actual location and the map-based location which is approximately 30 m in front of the actual location. The variable time interval, also called temporal offset, is used to bridge the period needed by a camera-based detection system to identify and output the notification.

As long as the vehicle is still within the predefined interval, the functional unit FE continuously monitors whether the second, camera-based detection system E2 has identified the same relevant event. If the same relevant event is identified by the camera-based detection unit E2 before the predefined interval has passed, the display of the request notification still remains active. The display remains active until a permission confirmation or a rejection is identified or until a new event which triggers withdrawal of the display or a new request notification occurs. However, if the same relevant event is not identified by the camera-based detection unit E2 before the predefined interval has passed, the display is withdrawn after the interval has expired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinally guiding driver assistance system in a motor vehicle, comprising:
    a map-based detection system that identifies upcoming events which result in a change in a maximum permissible maximum speed;
    a functional unit that, if a relevant upcoming event is identified by the map-based detection system, causes output of a request notification to permit an automatic adjustment of a current maximum permissible maximum speed to a new maximum permissible maximum speed at a defined time before the relevant upcoming event is reached, wherein
        the functional unit is configured to cause withdrawal of the output of the request notification if a manually triggered permission confirmation is identified or if a rejection is identified, and to cause withdrawal of the output of the request notification only after a location of the relevant upcoming event, as identified using the map-based detection system, has been passed if the manually triggered permission confirmation is not identified and if the rejection is not identified.

2. The longitudinally guiding driver assistance system as claimed in claim 1, wherein
    the functional unit is configured, if the manually triggered permission confirmation is not identified and if the rejection is not identified, to cause withdrawal of the output of the request notification at an earliest when the relevant upcoming event identified using the map-based detection system has been reached or a time and/or distance interval which begins upon reaching the relevant upcoming event has passed.

3. The longitudinally guiding driver assistance system as claimed in claim 2, wherein
the functional unit is configured, if the manually triggered permission confirmation is not identified and if the rejection is not identified, to cause withdrawal of the output of the request notification after the time and/or distance interval has passed only when the same relevant upcoming event has not been identified using a camera-based detection system before the time or distance interval has passed.

4. The longitudinally guiding driver assistance system as claimed in claim 3, wherein
the time or distance interval is variable on the basis of predefined parameters.

5. The longitudinally guiding driver assistance system as claimed in claim 2, wherein
the time or distance interval is variable on the basis of predefined parameters.

6. The longitudinally guiding driver assistance system as claimed in claim 2, wherein
the time and/or distance interval is composed of a constant interval portion and a speed-dependent interval portion.

7. The longitudinally guiding driver assistance system as claimed in claim 3, wherein
the time and/or distance interval is composed of a constant interval portion and a speed-dependent interval portion.

8. The longitudinally guiding driver assistance system as claimed in claim 1, wherein
the longitudinally guiding driver assistance system is a speed regulation system for regulating speed to a predefined desired speed, and
the functional unit is configured to cause the speed to be regulated to the new maximum permissible maximum speed if the manually triggered permission confirmation is identified.

9. The longitudinally guiding driver assistance system as claimed in claim 2, wherein
the longitudinally guiding driver assistance system is a speed regulation system for regulating speed to a predefined desired speed, and
the functional unit is configured to cause the speed to be regulated to the new maximum permissible maximum speed if the manually triggered permission confirmation is identified.

10. The longitudinally guiding driver assistance system as claimed in claim 3, wherein
the longitudinally guiding driver assistance system is a speed regulation system for regulating speed to a predefined desired speed, and
the functional unit is configured to cause the speed to be regulated to the new maximum permissible maximum speed if the manually triggered permission confirmation is identified.

11. The longitudinally guiding driver assistance system as claimed in claim 1, wherein
the longitudinally guiding driver assistance system is a speed restriction system for preventing a maximum permissible maximum speed from being exceeded, and
the functional unit is configured to avoid the new maximum permissible maximum speed being exceeded if the manually triggered permission confirmation is identified.

12. The longitudinally guiding driver assistance system as claimed in claim 2, wherein
the longitudinally guiding driver assistance system is a speed restriction system for preventing a maximum permissible maximum speed from being exceeded, and
the functional unit is configured to avoid the new maximum permissible maximum speed being exceeded if the manually triggered permission confirmation is identified.

13. The longitudinally guiding driver assistance system as claimed in claim 3, wherein
the longitudinally guiding driver assistance system is a speed restriction system for preventing a maximum permissible maximum speed from being exceeded, and
the functional unit is configured to avoid the new maximum permissible maximum speed being exceeded if the manually triggered permission confirmation is identified.

\* \* \* \* \*